United States Patent [19]

Kiyooka et al.

[11] Patent Number: 5,058,448
[45] Date of Patent: Oct. 22, 1991

[54] RACK AND PINION STEERING DEVICE

[75] Inventors: Masanori Kiyooka; Etsuro Kitami; Shigehiko Sakaguchi; Katsuya Takeuchi, all of Osaka, Japan

[73] Assignee: Koyo Seiko Co., Ltd., Osaka, Japan

[21] Appl. No.: 426,353

[22] Filed: Oct. 25, 1989

[30] Foreign Application Priority Data

| Oct. 27, 1988 | [JP] | Japan | 63-140886[U] |
| Oct. 27, 1988 | [JP] | Japan | 63-140887[U] |
| Apr. 10, 1989 | [JP] | Japan | 1-42244[U] |

[51] Int. Cl.⁵ .............................................. B62D 3/12
[52] U.S. Cl. ........................................ 74/422; 74/498; 384/420; 384/909
[58] Field of Search ............... 74/89.17, 422, 498; 180/147, 148; 384/420, 425, 909

[56] References Cited

U.S. PATENT DOCUMENTS

| 2,600,353 | 6/1952 | Wightman | 384/420 |
| 2,606,083 | 8/1952 | Kitto et al. | 384/420 |
| 2,871,069 | 1/1959 | Weber | 384/420 |
| 3,421,387 | 1/1969 | Adams | 74/498 |
| 4,050,130 | 9/1977 | Pitner | 384/425 X |
| 4,383,631 | 5/1983 | Fairchild | 242/151 X |
| 4,724,717 | 2/1988 | Chikuma | 74/498 |

FOREIGN PATENT DOCUMENTS 59-30773 2/1984 Japan.

Primary Examiner—Allan D. Herrmann
Attorney, Agent, or Firm—Armstrong, Nikaido, Marmelstein, Kubovcik & Murray

[57] ABSTRACT

A support yoke pressed against a rack bar to preload the rack relative to a pinion has a roller for guiding the rack bar by contact therewith. A plate of synthetic resin is interposed between each end face of the roller and the roller mount portion of the support yoke opposed thereto.

4 Claims, 6 Drawing Sheets

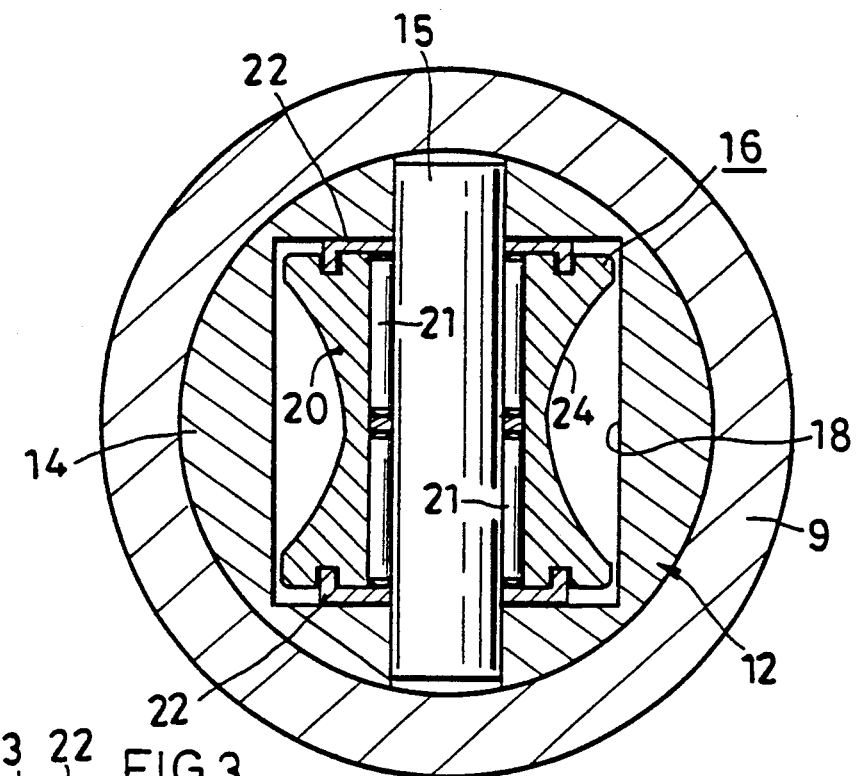
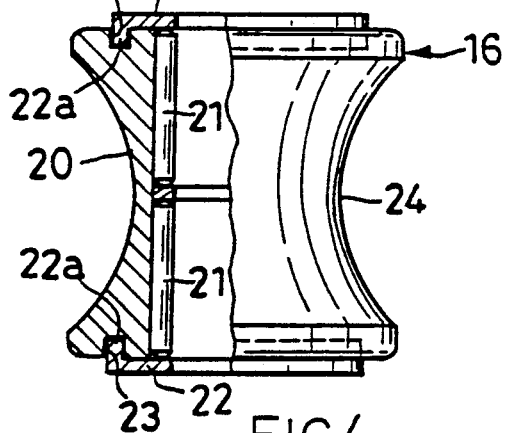
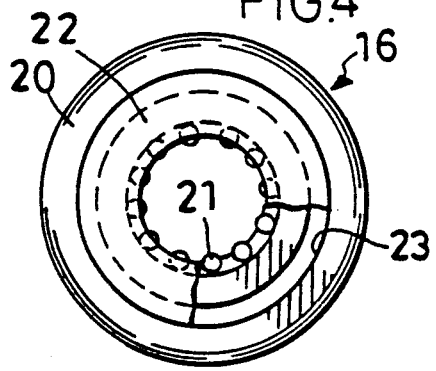
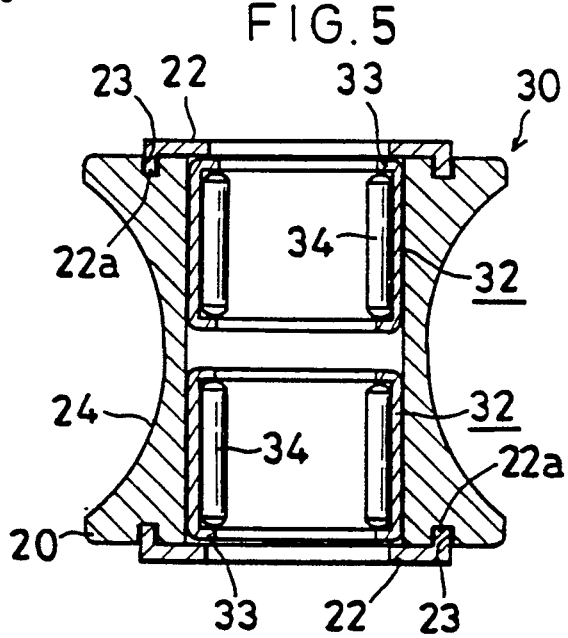

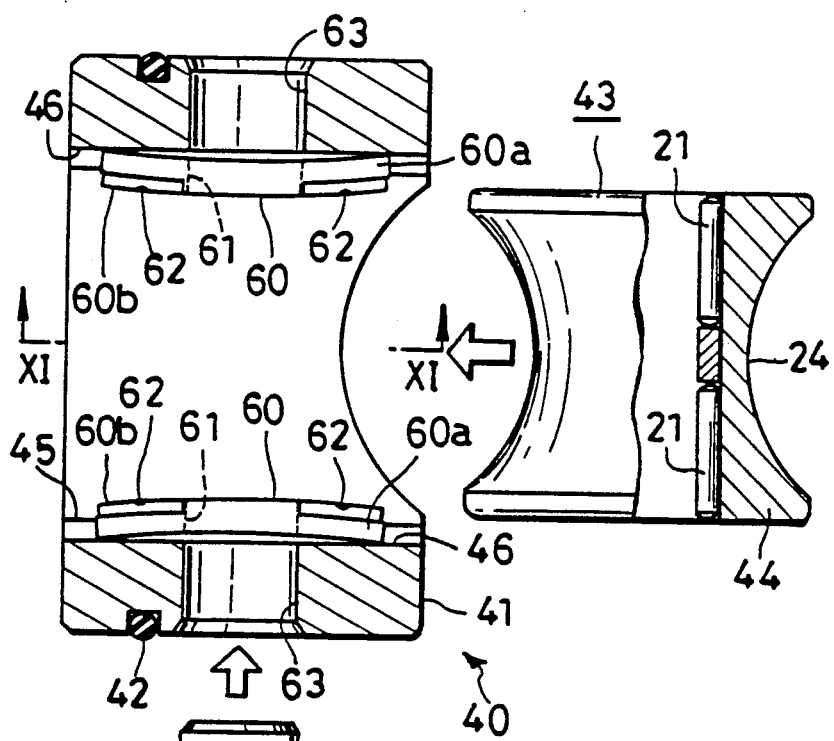
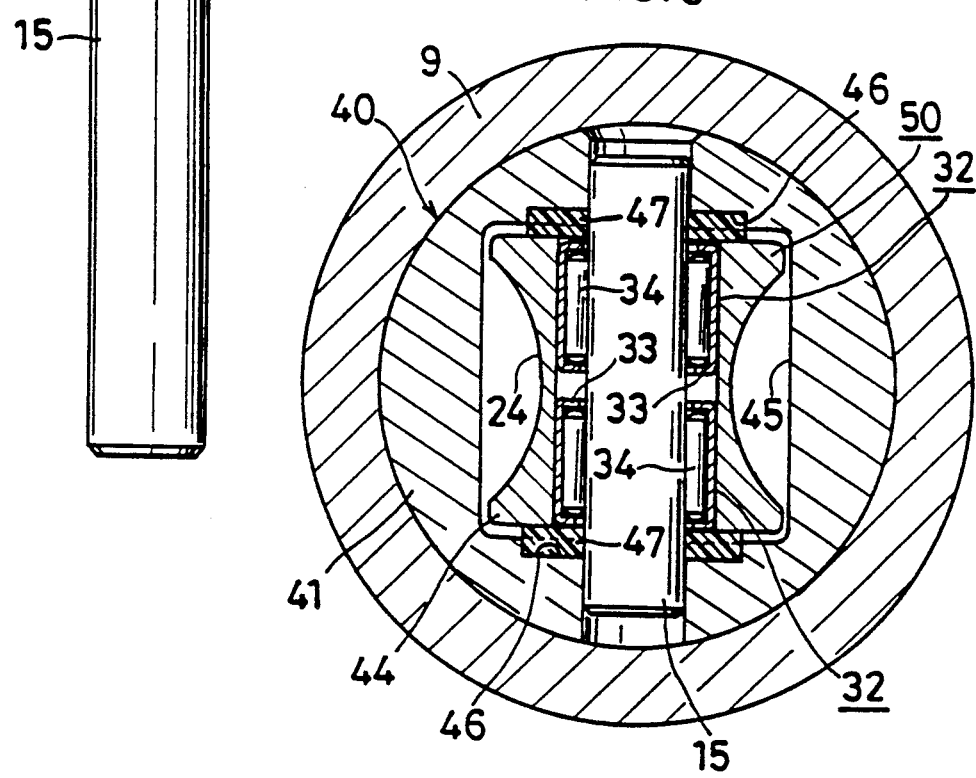

RACK AND PINION STEERING DEVICE

BACKGROUND OF THE INVENTION

The present invention relates to rack and pinion steering devices for use in motor vehicles and the like.

With conventional rack and pinion steering devices, a blocklike support yoke is pressed against a rack bar by a spring to preload the rack relative to a pinion meshing therewith.

However, the sliding contact between the support yoke and the rack bar involves great resistance, which adversely affects the efficiency of the device. This tendency becomes pronounced especially in the case of manual steering devices.

Accordingly, a support yoke has been proposed which has a roller for guiding the rack bar in contact therewith (see Unexamined Japanese Utility Model Publication SHO 59-30773).

In this case, opposite end faces of the roller which is made of metal collide with the roller mount portion of the support yoke which is also made of metal, giving rise to the problem of producing a metallic noise. The proposed support yoke has another problem in that friction occurs between the roller end face and the roller mount portion of the yoke to exert an adverse influence on the performance.

SUMMARY OF THE INVENTION

The main object of the present invention is to provide a rack and pinion steering device wherein the sliding resistance of the rack bar and the frictional resistance of a roller included therein are both diminished and which is operable without giving off a metallic noise.

The present invention provides a rack and pinion steering device wherein a support yoke pressed against a rack bar to preload the rack relative to a pinion has a roller for guiding the rack bar by contact therewith. The device is characterized in that a plate of synthetic resin is interposed between each end face of the roller and the roller mount portion of the support yoke opposed thereto.

The synthetic resin to be used for forming the plate is, for example, polyacetal resin, polyamide resin, fiber-reinforced polyamide resin or the like.

Since the roller of the support yoke guides the rack bar by contact therewith, the rack bar is slidable with reduced resistance, assures the device of an improved efficiency and gives a feeling of smoothness when the device is operated for steering. The synthetic resin plate provided between the roller mount portion of the support yoke and each end face of the roller prevents the metallic noise that would be produced by the contact of the roller with the roller mount portion, diminishes the frictional resistance of the roller and affords stabilized performance.

The synthetic resin plate may be attached to each end face of the roller or to the roller mount portion of the support yoke.

Generally, the roller mount portion of the support yoke is prepared from a sintered alloy, and the roller from a bearing steel. In such a case, the synthetic resin plate is attached to the roller mount portion of the support yoke. The plate will then slide on the roller of bearing steel which is highly resistant to abrasion without sliding on the roller mount portion which is low in abrasion resistance. This precludes the wear of the roller mount portion by the plate, while the wear of the roller can be diminished.

The synthetic resin plate, which can be shaped as desired, is for example in the shape of a planar plate, or is prepared from a material of suitable elasticity in the form of a segment of a hollow cylinder so curved in a spontaneous state that it has a bulging surface to be opposed to the roller and an inwardly curved surface to face the roller mount portion of the support yoke.

In the latter case, the roller can be readily placed in between the opposed resin plates even if the plates are not accurately dimensioned. When the roller is installed in place, moreover, each plate is elastically deformed to come into pressing contact with both the roller end face and the roller mount portion and preclude the backlash therebetween.

BRIEF DESCRIPTION OF THE DRAWINGS

FIG. 2 is a view in section taken along the line II—II in FIG. 1;

FIG. 3 is a side elevation partly broken away and showing a roller unit;

FIG. 4 is a front view partly broken away and showing the same;

FIG. 5 is a view in vertical section showing a roller unit according to a second embodiment;

FIG. 9 is a view corresponding to FIG. 7 and showing a fourth embodiment;

FIG. 10 is an exploded side elevation partly broken away and showing a support yoke according to a fifth embodiment;

DESCRIPTION OF THE PREFERRED EMBODIMENTS

Figure 1:
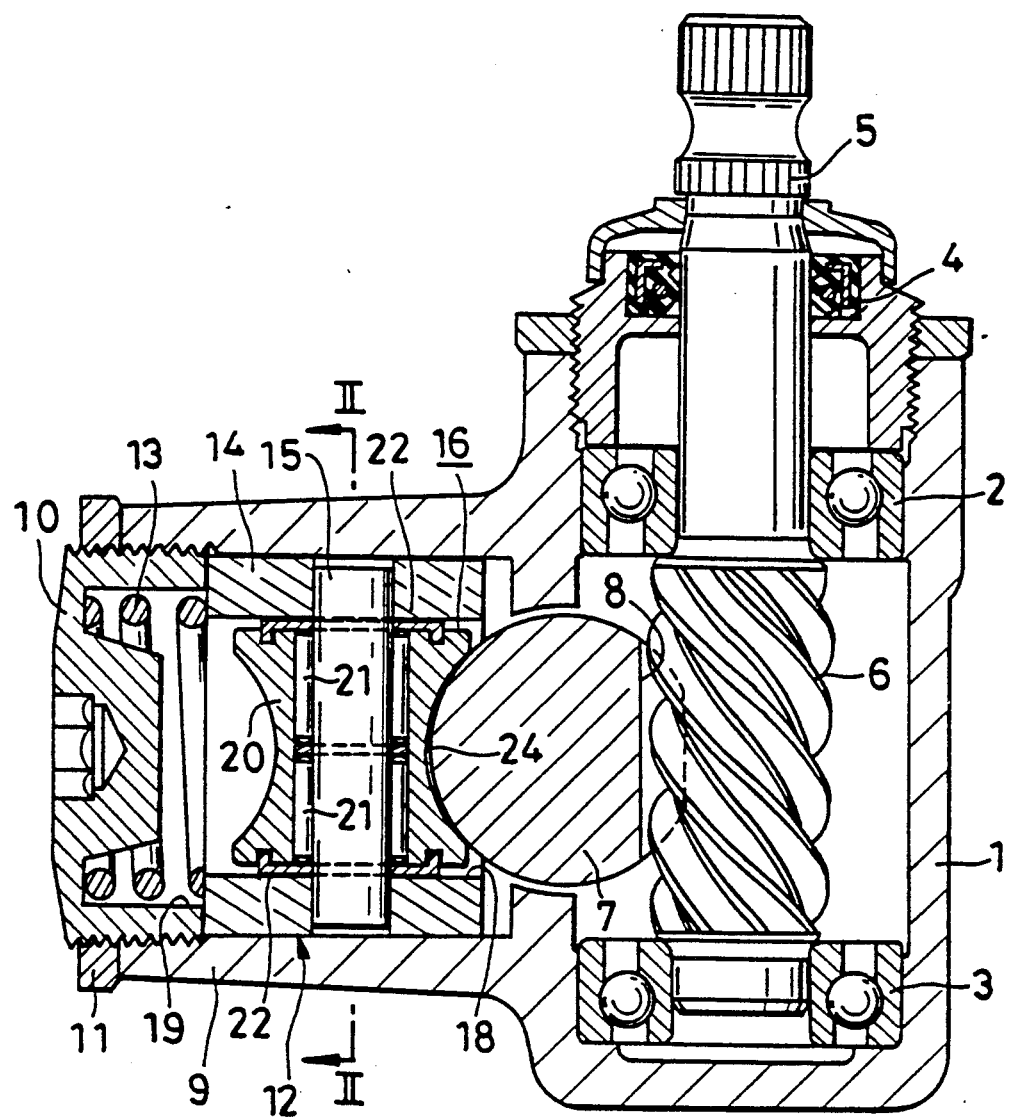
FIG. 1 is a view in vertical section showing a rack and pinion steering device as a first embodiment of the invention.

The present invention will be described below with reference to several embodiments thereof shown in the drawings and useful as rack and pinion steering devices for motor vehicles. Throughout the drawings showing the embodiments, like parts are designated by like reference numerals.

FIGS. 1 to 4 show a first embodiment.

As shown in FIGS. 1 and 2, a pinion shaft 5 is rotatably supported by a housing 1 with bearings 2, 3 and an oil seal 4 provided therein around the shaft. Meshing with a pinion 6 formed at an intermediate portion of the pinion shaft 5 is a rack 8 formed on the rear side of a rack bar 7 extending through the housing 1 transversely thereof. The housing 1 is integral with a hollow cylindrical portion 9 projecting forward from the front side thereof. A cap 10 is screwed in the front end of the cylindrical portion 9 and fixed thereto with a lock nut 11. A support yoke 12 is fitted in between the cap 10 and the rack bar 7 in the cylindrical portion 9 so as to be slightly movable forward or rearward. A coiled compression spring 13 is provided between the cap 10 and the support yoke 12 for pressing the support yoke 12 against the rack bar 7 to preload the rack 8 relative to the pinion 6.

The support yoke 12 comprises a movable block 14 fitted in the cylindrical portion 9 so as to be slightly movable forward or rearward, a pin 15 fixedly provided in the block 14, and a roller unit 16 rotatably supported by the pin 15. The block 14 is centrally formed with a bore 18 extending therethrough longitudinally of the cylindrical portion 9 and having a rectangular cross section. The pin 15 extends across the bore 18 and in parallel to the pinion shaft 5. The spring 13 is accommodated in a circular cavity 19 in the cap 10 and bears on the front end face of the block 14.

With reference to FIGS. 3 and 4, the roller unit 16 is in the form of an assembly comprising a roller 20 serving also as a bearing outer ring, and two needle roller bearings 21 incorporated inside the roller 20. An apertured disk 22 made of a synthetic resin, such as polyacetal resin or polyamide resin, is secured to each of opposite end faces of the roller 20. A short cylindrical portion 22a formed along the outer peripheral edge of the disk 22 integrally therewith is fixed in an annular groove 23 formed in the end face of the roller 20. The roller unit 16 is fitted in the bore 18 of the block 14, with the pin 15 extending through the bearings 21. Almost no clearance is formed between the disk 22 on each end of the roller 20 and the bore-defining wall of the block 14. An annular groove 24 having a circular-arc cross section is formed in the outer periphery of the roller 20, and the grooved roller portion is in contact with the front side of cylindrical surface of the rack bar 7. The grooved portion is pressed against the rack bar 7 by the spring 13.

When the rack bar 7 moves laterally, the roller 20 rotates to guide the bar, so that the sliding resistance of the rack bar 7 is small. Although the rotation of the roller 20 produces friction between the disk 22 at each roller end and the block 14, the frictional resistance is small since the disk 22 is made of synthetic resin. Moreover, the disk 22 prevents the metallic noise that would otherwise be produced by the contact of the roller 20 with the block 14.

FIG. 5 shows a second embodiment.

The second embodiment differs from the first embodiment only in respect of a roller unit 30, which alone is therefore shown in FIG. 5.

The roller unit 30 of the second embodiment comprises the same roller 20 as in the first embodiment, and two shell type needle roller bearings 32 provided inside the roller 20. Each of the bearings 32 comprises a shell 33 in the form of a hollow cylinder formed with an inward flange at each end thereof, and a plurality of rollers 34 arranged inside the shell 33 and each having tapered opposite ends. The shell 33 is provided in the roller 31 by a press fit.

In this case, the shell 33 of the bearing 32 prevents the rollers 34 from moving axially thereof into contact with the disk 22, thus preventing the wear of the disk 22 by the rollers 34. Further because the rollers 34 of the bearing 32 is retained by the shell 33 as a unit, the roller unit 30 and the pin 15 are easy to assemble into a support yoke.

Figure 6:
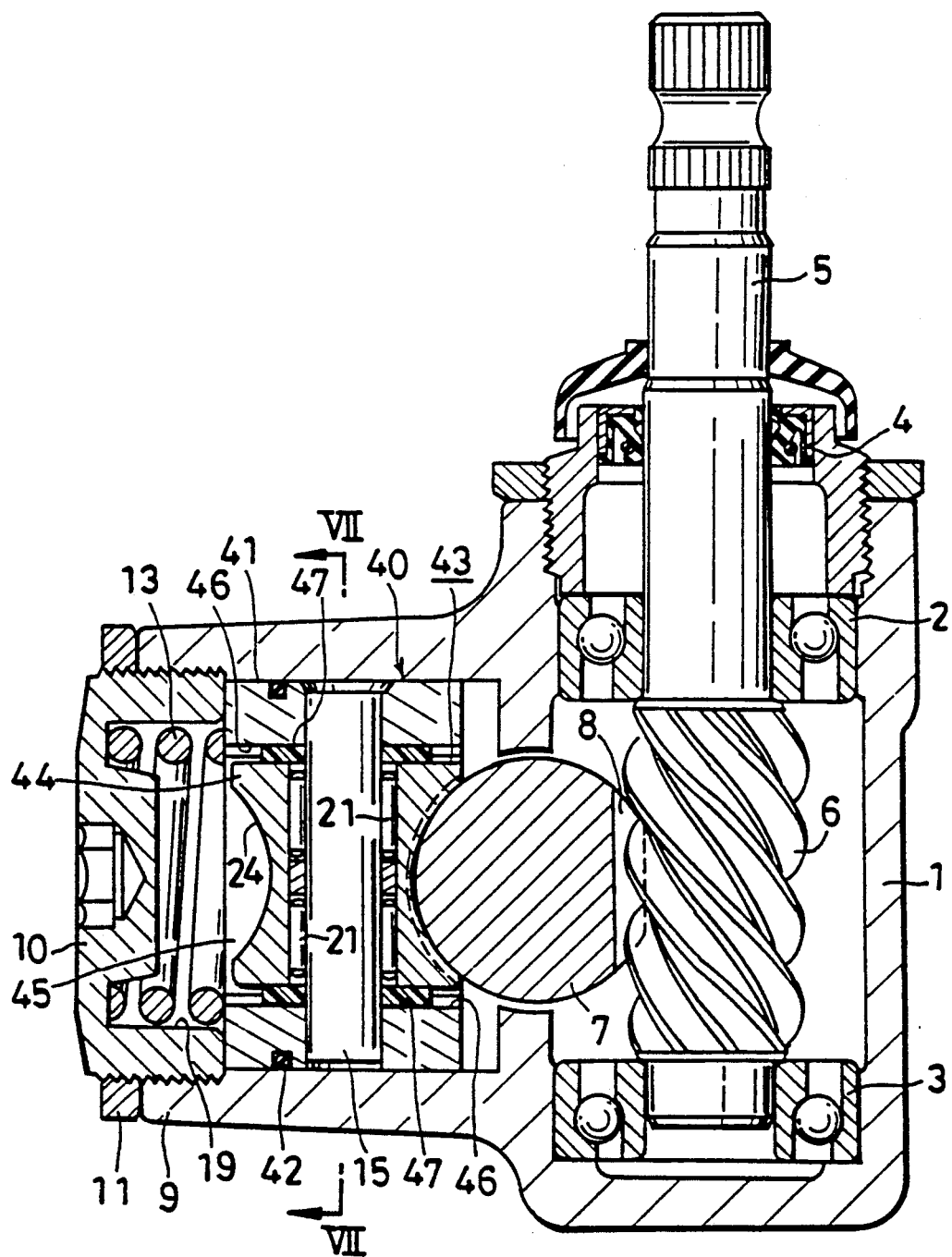
FIG. 6 is a view in vertical section showing a rack and pinion steering device as a third embodiment.
Figure 7:
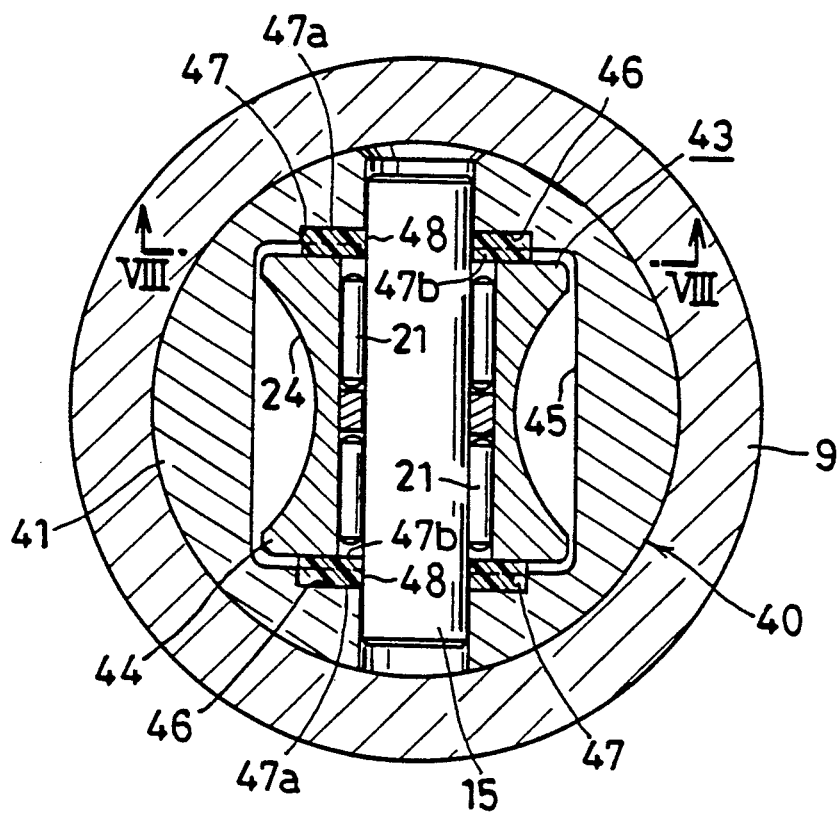
FIG. 7 is an enlarged view in section taken along the line VII—VII in FIG. 6.
Figure 8:
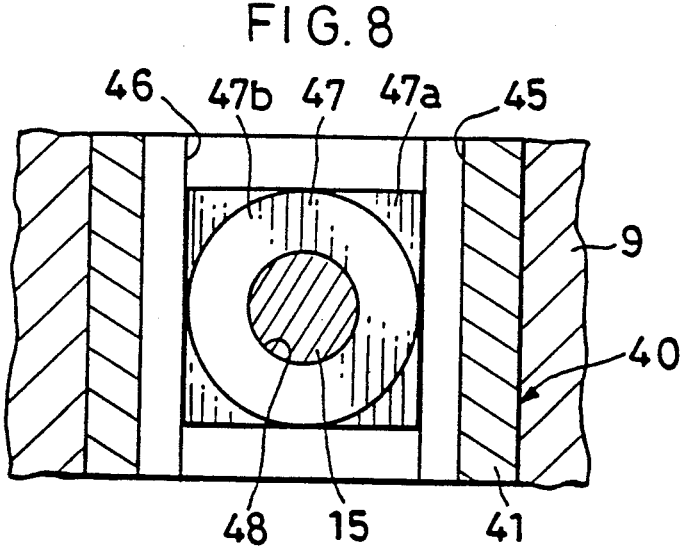
FIG. 8 is a view in section taken along the line VIII—VIII in FIG. 7.

FIGS. 6 to 8 show a third embodiment.

The third embodiment includes a support yoke 40 which partly differs from the yoke of the first embodiment.

The support yoke 40 of the third embodiment has a movable block 41 made of a sintered alloy and provided with an 0-ring 42 in its outer periphery. The roller 44 of a roller unit 43 is made of a bearing steel and has no synthetic resin plate attached to its opposite end faces.

The block 41 is formed with a bore 45 of rectangular cross section and has a pin 15 fixed to the wall thereof. A shallow groove 46 having a width larger than the diameter of the pin 15 is formed over the entire length of the block in its bore-defining wall portion where each end of the pin 15 is fixed. Fixed in the groove 46 is a plate 47 made of a synthetic resin such as polyamide resin reinforced with potassium titanate fibers. The synthetic resin plate 47 comprises a rectangular portion 47a having about one half of the thickness of the plate 47, and a circular portion 47b integral with the portion 47a and having approximately the other half of the thickness as shown in detail in FIG. 8. The plate 47 has a circular hole 48 in its center. The rectanular portion 47a is fitted in the groove 46 of the block 41, and the pin 15 is inserted through the circular hole 48, whereby the synthetic plate 47 is secured to the block 41. The circular portion 47b is slidable in contact with the end face of the roller 44.

The synthetic resin plate 47 of the third embodiment also produces the same effects as in the case of the first embodiment. Although a small clearance is formed in the housing cylindrical portion 9 around the block 41 of the support yoke 40 to render the block 41 movable forward or rearward, the noise to be produced by the collision of the block with the portion 9 is prevented by the O-ring 42. The synthetic resin plate 47 is secured to the block 41 of sintered alloy having low abrasion resistance and is slidable in contact with the roller 44 of bearing steel having high abrasion resistance, so that the block 41 will not be worn by the resin plate 47, while the wear of the roller 44 is small. The plate 47 itself will not wear markedly since the plate 47 is made of polyamide resin reinforced with potassium titanate fibers and therefore has high abrasion resistance.

FIG. 9 shows a fourth embodiment.

The fourth embodiment includes a roller unit 50, in which the same shell type needle roller bearings 32 as used in the second embodiment are provided in place of the needle roller bearings 21 used in the third embodiment.

Figure 11:
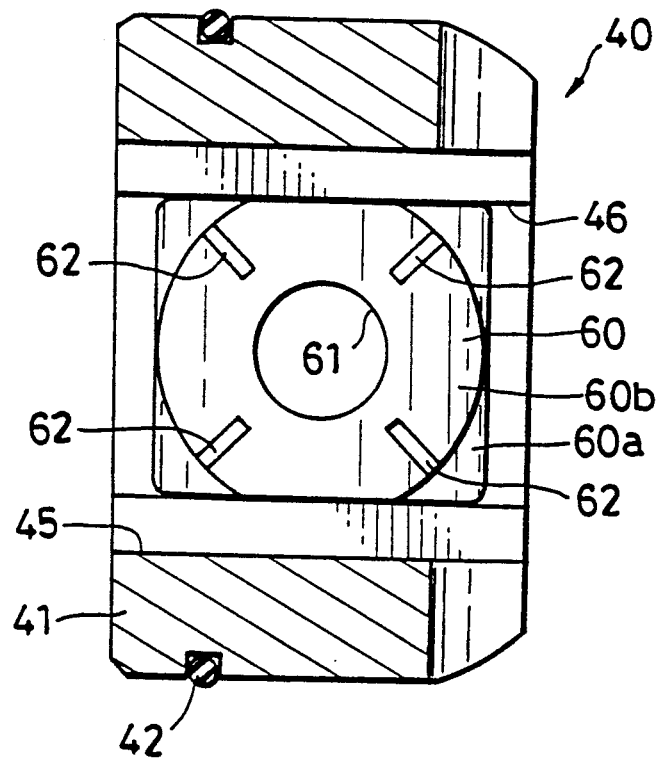
FIG. 11 is a view in section taken along the line XI—XI in FIG. 10.
Figure 12:
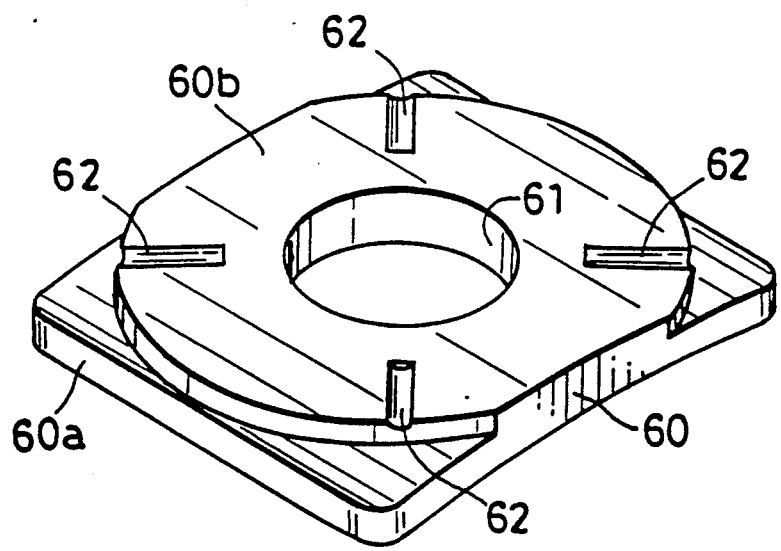
FIG. 12 is a perspective view showing a synthetic resin plate.

FIGS. 10 to 12 show a fifth embodiment.

The fifth embodiment includes synthetic resin plates 60 which are different from those in the third embodiment.

Each synthetic resin plate 60 of the fifth embodiment also comprises a rectangular portion 60a fitted in the groove 46 in the bore-defining wall of the support yoke block 41, and a circular portion 60b slidable in contact with the end face of the roller 44. The plate 60 is formed with a circular hole 61 centrally thereof. The circular portion 60b has a large diameter, and the circle is locally cut out along opposed two sides of the rectangular portion 60a. Consequently, the resin plate 60 is in contact with the end face of the roller 44 over an increased area and is less likely to wear. The circular portion 60b is further formed in surface portions thereof toward its outer periphery with four shallow oil grooves 62 having a circular-arc cross section and extending diagonally (radially) of the rectangular portion 60a. The synthetic resin plate 60 is in the form of a segment of a hollow cylinder having a large radius of curvature and so curved in a spontaneous state that it bulges on one side thereof having the circular portion 60b and curves inward on the other side thereof having the rectangular portion 60a. The axis of the curvature of the segment is perpendicular to the center line of the bore 45 of the block 41 and also to the center line of the pin 15. The synthetic resin plate 60 is made, for example, of polyacetal resin so as to exhibit suitable elasticity, and can be deformed to a planar plate when subjected to a force.

The support yoke 40 of the fifth embodiment is assembled in the following manner.

First, the rectangular portions 60a of two synthetic resin plates 60 are fitted in the respective grooves 46 in the bore 45 of the block 41 and temporarily secured therein. At this time, the resin plates 60 are so arranged that the tops of the bulging circular portions 60b are positioned at the midportion of length of the block 41 (laterally midportion in FIG. 10). The roller unit 43 with the roller bearings 21 held inside the roller 44 as with grease is inserted into the space between the two resin plates 60 within the bore 45 from the front or rear. The pin 15 is then inserted from one side of the block 41 through a circular hole 63 in the block 41 and the hole 61 in the resin plate 60 at one side, then through the center of the roller unit 43, and further through the hole 61 of the other plate 60 and a circular hole 63 in the block at the other side, and is fixed to the block 41 to fix the resin plates 60 and rotatably support the roller unit 43.

In the case where the resin plate 47 is planar in a spontaneous state as in the third and fourth embodiments, the resin plate 47, if thin, will backlash relative to the end face of the roller 44 and to the bottom of the groove 46 in the block 41, whereas if the plate 47 is too thick, the roller 44 can not always be assembled into the support yoke, hence the necessity of making the resin plate dimensionally accurate. In the case of the fifth embodiment, however, the resin plate 60 is spontaneously curved as prepared, therefore need not be accurately dimensioned and nevertheless ensures facilitated assembling of the roller 44.

In the case of the fifth embodiment, the opposed resin plates 60 are curved away from each other toward their front and rear ends with an increasing distance therebetween, so that the roller 44 can be readily inserted into the space between the plates even if the dimensions of the plates 60 involve some errors. The opposed resin plates 60 are so curved as to become closer to each other toward the central portions thereof with respect to the front-rear direction with a decreasing distance between the plates. Consequently, the central portions are pushed by the roller 44, whereby the resin plates 60 are deformed nearly to a planar shape. When the roller 44 has been assembled into the support yoke, each resin plate 60, even if somewhat inaccurately dimensioned, is therefore brought into pressing contact with both the end face of the roller 44 and the bottom of the groove 46 of the block 41 and will not backlash between these portions.

The same shell type needle roller bearings 32 as used in the fourth embodiment can be incorporated in the roller unit 43 of the fifth embodiment.

What is claimed is:

1. A rack and pinion steering device having a support yoke housing, a rotatable pinion provided inside said housing and rotated by rotation of a steering wheel, a rack bar meshing with said pinion inside said housing and moving axially according to the rotation of said pinion, a hollow cylindrical portion formed perpendicular to said rack bar and disposed on the opposite side of said rack bar from said pinion, and a support yoke provided so as to be pressed against said rack bar for prestressing said rack bar against said pinion inside said hollow cylindrical portion, said rack and pinion steering device characterized in that said support yoke comprises:
    a hollow metallic cylindrical case having a rectangular hollow portion;
    a fixed pin extending to a direction perpendicular to an axial direction of said rack bar and interposed between opposed side walls of said rectangular hollow portion;
    a metallic roller supported by said pin with needle roller bearings therebetween and guiding said rack bar with an outer surface thereof; and
    a synthetic resin plate between each of the opposite end faces of said metallic roller and each of said opposite side walls of said metallic case, one side of each said plate contacting an end face of said metallic roller and the other side of said plate contacting a side wall of said metallic case, said resin plate, at each of opposite end faces of said metallic roller, having a cylindrical portion formed integrally along the outer periphery of said resin plate and fixed in an annular groove formed in an opposing face of one of said rectangular portion of said hollow case or said roller.

2. A device as defined in claim 1 wherein the synthetic resin plate is fixed in an annular grooved formed in an opposing face of said roller.

3. A device as defined in claim 1 wherein the synthetic resin plate is fixed in an annular grooved formed in an opposing face of one of said rectangular portions of said hollow case.

4. A rack and pinion steering device having a support yoke housing, a rotatable pinion provided inside said housing and rotated by rotation of a steering wheel, a rack bar meshing with said pinion inside said housing and moving axially according to said pinion, a hollow cylindrical portion formed perpendicular to said rack bar and disposed on the opposite side of said rack bar from said pinion, and a support yoke provided so as to be pressed against said rack bar for prestressing said rack bar against said pinion inside said hollow cylindrical portion, said rack and pinion steering device characterized in that said support yoke comprises;
    a hollow metallic cylindrical case having a rectangular hollow portion;
    a fixed pin extending to a direction perpendicular to an axial direction of said rack bar and interposed between opposed side walls of said rectangular hollow portion;
    a metallic roller supported by said pin with needle roller bearings therebetween and guiding said rack bar with an outer surface thereof;
    a synthetic resin plate between each of the opposite end faces of said metallic roller and each of said opposite side walls of said metallic case, one side of each said plate contacting and end face of said metallic roller and the other side of said plate contacting a side wall of said metallic case, said resin plate having suitable elasticity and being in the form of a segment of a hollow cylinder so curved that it has a bulging side to be opposed to said metallic roller and an inwardly curved side to face said opposed face of one of said rectangular portions of said hollow case.

* * * * *